US005518863A

United States Patent [19]
Pawluczyk

[11] Patent Number: 5,518,863
[45] Date of Patent: May 21, 1996

[54] METHOD OF CHANGING THE OPTICAL INVARIANT OF MULTIFIBER FIBER-OPTIC ELEMENTS

[75] Inventor: Romuald Pawluczyk, Cap-Rouge, Canada

[73] Assignee: Institut National D'Optique, Quebec, Canada

[21] Appl. No.: 270,490

[22] Filed: Jul. 5, 1994

Related U.S. Application Data

[63] Continuation-in-part of Ser. No. 819,982, Jan. 31, 1992, abandoned.

[51] Int. Cl.⁶ ..................................................... G02B 6/04
[52] U.S. Cl. ........................... 430/321; 385/33; 385/119; 216/24; 216/26
[58] Field of Search .................................. 430/321, 323; 385/33, 119; 216/24, 26

[56] References Cited

U.S. PATENT DOCUMENTS

| 5,169,677 | 12/1992 | Sangyoji et al. | 427/581 |
| 5,346,583 | 9/1994 | Basavanhally | 216/26 |
| 5,384,882 | 1/1995 | Shimamune et al. | 385/116 |

*Primary Examiner*—Charles L. Bowers, Jr.
*Assistant Examiner*—John A. McPherson
*Attorney, Agent, or Firm*—Michael D. Bednarek; Marks & Murase

[57] ABSTRACT

The multifiber fiber-optic element for use in image transfer comprises a large number of packed optic fibers cemented together at least at the ends, and microlenses formed on at least one of the two end facets of the fibers, whereby the optical invariant of the element can be changed by said microlenses. A method for providing the microlenses light redistributing structures is also disclosed.

15 Claims, 6 Drawing Sheets

METHOD OF CHANGING THE OPTICAL INVARIANT OF MULTIFIBER FIBER-OPTIC ELEMENTS

BACKGROUND OF THE INVENTION

This application is a continuation-in-part of U.S. application Ser. No. 07/819,982, filed Jan. 31, 1992 and now abandoned. Applicant claims the benefit under 35 U.S.C. § 120 of that earlier application.

FIELD OF INVENTION

The present invention relates to multifiber fiber-optic elements and more particularly to a method for changing the optical invariant of such elements, as well as to multifiber fiber-optic elements provided with light redistributing structures.

DESCRIPTION OF THE PRIOR ART

Multifiber fiber-optic elements are widely used in modern optics. Elements with thousands of fibers are popular in different optical systems either on the illuminator side of the systems, as means to deliver the light to the required place (incoherent or coherent optical bundles) or, on the imaging side of the systems, as means to relay an image along a bent path from one place to another (coherent optical bundles). The shorter coherent fiber-optic elements, so called fiber-optic faceplates, are widely used to transfer the image from one surface to another. Both the faceplates and the longer coherent optical bundles with properly shaped faces can be used to transfer the image between surfaces of different shapes, acting in such a way as field curvature correctors. Fiber-optic elements can also be used as diffusers.

When such elements are used as a part of a more complex system, it is very important that the optical invariant of such elements corresponds to that of the remaining parts of the system. If this condition is not fulfilled, the system may lose some light and, consequently, the associated information. This results in degradation of the performance of the whole system. Therefore, methods for modifying the optical invariant without significant losses of light are of great importance.

The optical invariant of a fiber-optic element is roughly equal to the product of the area of the face of the element and the solid angle of the maximum spread-out of the light produced by such element. For a single fiber, it is equal to the product of the cross-sectional area of the core and the full solid aperture angle of the fiber which is simply related to the numerical aperture of the fiber and depends on the ratio of the refractive indices of the core and the cladding. For fibers with flat facets perpendicular to the fiber's axis, the numerical aperture of the fiber defines the light acceptance and emission cones. The acceptance cone limits the angle of the incidence of the light rays on the fiber's face; i.e., the angle at which the light rays can be accepted by the fiber, while the emission cone limits the angles within of which the light rays can leave the fiber.

For a multifiber fiber-optic element the optical invariant of the whole element is equal to the product of the area of the face of the element and doubled angular aperture of the light which can leave or be accepted by the element; i.e., the full angle of the maximal spread-out of the light emitted or accepted by the element. If the multifiber fiber-optic element is made of identical fibers, the angular aperture of the whole element is equal to that of the single fiber, while the area of the face of the element depends on the number of the fibers in the element and constructions of the fiber and the element itself. Because of the fiber's cladding and cement between the fibers, the area of the face is usually much larger than the sum of the cross sections of the cores of all fibers creating the element. The ratio of that sum to the area of the face of the fiber-optic element is called a fill factor.

Every transformation of the light field by means of some optical system leads to some losses of light. However, these losses can be minimized by applying different means (glasses of high transmittance, high quality antireflection layers and so on) to the systems which preserve the optical invariant. It is difficult to avoid losses of light when the optical invariant of the light beam passing the system is not preserved. The physical mechanism of these losses is different depending if the invariant is increased or reduced.

Within classical optics, reduction of the optical invariant of a whole multifiber fiber-optic element is impossible without significant losses of light since the only way to do it is by physically limiting either the field of view or the aperture of the system. For this reason, any practical solution to the problem cannot exist. The properties of multifiber fiber-optic elements consisting of many fibers with light emitting cores spatially separated by a distance larger than the diameter of these cores provide a new opportunity for reducing the optical invariant of such an element without significant losses of light. It consists of reducing the divergence of the beam emitted by each fiber with an individual optical element (microlens) which does not change the optical invariant of the interacting beam and as a result does not introduce any significant losses of light. Of course, there still exists some physical limitations, since geometrical restrictions limit the achievable reduction of divergence for each individual beam. The possible gain depends upon the ratio of the distance between neighboring fibers to the diameter of the core.

The only way to reduce the divergence is to put a focusing lens in the light beam. For single fiber or a limited number of fibers, such transformation is possible by mounting an individual lens in front of each spatially separated fiber. This solution is quite common in telecommunication applications, but it is clear that it is technically impossible in multifiber fiber-optic elements like fiber-optic bundles, fiber-optic faceplates or fiber-optic diffusers. In these cases, a completely different approach is required.

A way to reduce the divergence of a light beam is to put a focusing lens at the end of each fiber, while increasing the divergence is possible either with the help of microlenses placed in front of each fiber or by other means (the scattering of the light in particular). Normally a light scattering structure does not allow for an acceptable control of the light losses. To some extent, these losses can be controlled if such a structure is created holographically. For better control, however, the scattering elements should be properly optimized and individually aligned to each fiber of the element.

It is known in the art to form a microlens on the end of a single optical fiber by melting a microball on the end (as described in U.S. Pat. No. 4,380,365) or by using a photoresist processing method as described in "Microlenses for Coupling Junction Lasers to Optical Fibers" by Cohen and Schneider, Applied Optics January 1974 pp 89–94. These techniques are used to couple optical fibers, and not to change the optical invariant, since the optical invariant of a single fiber cannot be changed.

It is also known to provide an ordered array of lenses on a cover plate of an optical multifiber element, as described in "The Manufacture of Microlenses by Melting Photoresist" by Daly et al., Meas. Sci. Technol. 1 (1990) pp 759–766. Diffraction gratings are used to create a regular pattern of microlenses on the cover plate which are to be matched up with each fiber of the multifiber element. For practical considerations, it is difficult to manufacture multifiber fiber optic elements having a regularly ordered array of fibers which can be used with such a cover plate. An easier method to manufacture multifiber elements with microlenses is required, since one conventional way to manufacture the multifiber element is, for example, to form a coil of optical fiber having a turn length equal to the desired length of the element and a number of turns equal to the number of fibers in the element. The coil is cemented and then cut transversely through the cement to form a linear flexible element having individual fibers which are located in an identical positional arrangement.

OBJECTS OF THE INVENTION

An object of the invention is to provide a method for changing the optical invariant of a multifiber fiber-optic element by creating light redistributing structures directly on the face of individual fibers of a fiber-optic element and for producing such structures in a way to allow control of the optical characteristics of such structures.

Another object of the invention is to provide a multifiber fiber-optic element provided with such light redistributing structures.

SUMMARY OF THE INVENTION

The invention provides methods to modify an optical invariant of the multifiber fiber-optic element by creation of light redistributing structure on the face of the element. Depending upon specific requirements, different methods can be applied to create such structures. There are, however, distinguishable differences between these methods depending whether the optical invariant has to be reduced or increased. For this reason two separate preferred embodiments of the invention are presented.

As it was shown in the introduction, no method exists for reducing an optical invariant of an optical system without losses of light in normal optical systems. If, for some reason, a multifiber fiber-optic element has to be used, the situation becomes different. The distribution of the light intensity on the face of such an element is not continuous and it can be considered as a set of discrete light sources each with an area equal to the cross-section of the fiber's core. This distribution is directly related to the structure of the multifiber element which transfers the light only along the fiber's core, while the intensity transmitted through the cladding is practically equal to zero. As a result of such structure, the divergence of the total light beam emitted by the fiber-optic element is equal to the divergence of the beams emitted by each particular fiber, while the area of the whole element is larger than the sum of the core's cross-sections of all fibers. At the same time, the optical invariant of such a structure treated as an entity is equal to the product of its size by the solid angle of divergence of the emitted light. It is clear that this is larger than the sum of the optical invariants of the composing fibers. When such an element is treated as one entity, there is no way to modify its optical invariant without losses. However, if the light beam emitted by each fiber is transformed separately with low-loss optical elements preserving the optical invariant of the light leaving each fiber, the optical invariant of the whole element may be transformed with reduced losses. The above conclusion is the corner stone of the present invention providing means of controlling an optical invariant of a multifiber fiber-optic element with reduced losses. Furthermore, it provides technical means and methods to create the required structures on the faces of the multifiber fiber-optic element.

To reduce the optical invariant of a multifiber fiber-optic element, a focusing optical element light redistributing structure has to be created in the front of each composing fiber. For multifiber fiber-optic elements, there is not yet any practically feasible methods to create such a light redistributing structure. The invention presented provides means to create such a light redistributing structure by a multistep photographic or photolithographic methods.

According to the invention, the light, transmitted through the fibers in the multifiber element, is used to create a light redistributing structure in front of each fiber. It is well known that the intensity of the light at the exit end of a fiber strongly depends on the fiber's structure and on the method of excitation of the fiber. For single mode fibers, the radial distribution of the emitted light can be described with a Gaussian function. As such, the light redistributing structure is generally in the form of a single microlens associated with each fiber. For multimode fibers the light distribution is more complex and consists of many spots which are related to the mode structure of the light transferred by the fiber. Even in the last case, however, the averaged intensity distribution is covered by a nearly Gaussian envelope when the fiber has a small core. Accordingly, the light redistributing structure is likely to include a plurality of microlenses. It is clear, moreover, that the light emitted by such an element will create in front of each fiber a spot of the light with intensity decreasing along the radius of the fiber causing nonuniform exposure of photosensitive material placed in this area. After processing, such exposed photosensitive material will possess the areas with non-uniform optical properties. In particular, when a fiber-optic element is made of single mode fibers and if a negative photoresist is applied, a nonsoluble circularly symmetric drop of the photoresist will be generated in front of each fiber with a surface having bell-like envelope. Such a drop of photoresist will act as a small focusing lens placed exactly on the axis of the fiber. By proper selection of the exposure conditions, it is possible to create a microlens which will reduce the divergence of the light emitted by each fiber. As it has been explained earlier, this results in a reduction of the optical invariant of the whole multifiber fiber-optic element. When a positive photoresist is applied, the most exposed part will be removed during processing, thus creating a small cavity on its surface in front of the fiber. This cavity acts as a negative lens which increases the divergence of the light emitted by the fiber, and so increases the optical invariant of the multifiber fiber-optic element. Unfortunately, photoresists usually strongly absorb light, particularly in the blue and violet range of the spectrum and such microlenses cannot be used in situations where absorption cannot be neglected. For this reason, depending upon requirements, various other implementations of the process can be applied, such as using the photoresist in combination with chemical etching to shape the microlenses in the light redistributing structure on the fiber ends or on a transparent faceplate or layer.

In this specification, the terms "microlens" and "light redistributing structure" are used interchangeably. It should be understood, however, that "lens" as used herein does not necessarily mean an axially symmetric optical element, but instead refers to the structure formed according to the process of the present invention. More particularly, an axially symmetric optical lens element can be created photolithographically only when photosensitive material is exposed with a light beam having symmetric intensity distribution. Regardless of the distribution of incident light, the axially symmetric intensity distribution at the exit end of the fiber is only observed for so-called monomode fibers; i.e., fibers having a core diameter comparable to the wave length of applied light. In the case of multimode fibers which have a larger core diameter intensity distribution at the exit end of the fiber depends on coherence of applied light. Thus, when laser light is used it has a distinctive speckle-like structure, i.e., structure with random variations of the intensity. Exposure of the photoresist or other photosensitive material with such speckled light, after processing will result in an array of scattering centers of random size and depth correlated to intensity variations in the speckled light beam on the exit side of the fiber. This type of structure is also encompassed by the terms "light distributing structure" and microlenses as used herein.

The invention provides a method of changing the optical invariant of a multifiber fiber-optic element comprising the steps of:

providing a multifiber fiber-optic element which includes a plurality of individual optic fibers having first and second ends;

providing a layer of photosensitive material to cover the first ends of the plurality of optic fibers;

exposing the second ends of the fibers to substantially evenly diffuse light to which the photosensitive material is sensitive, part of the light entering at the second end and travelling along the fibers to expose the photosensitive material at the first end; and processing the layer at the first end to form thereat a microlens over each first end of the fibers.

The invention also provides a method of changing the optical invariant of a multifiber fiber-optic element comprising the steps of:

providing a multifiber fiber-optic element which includes a plurality of individual optic fibers having first and second ends;

providing a layer of photosensitive material to cover the first end;

exposing the layer to unevenly diffuse light to which the photosensitive material is sensitive, to expose the photosensitive material at the first end; and processing the photosensitive material at the first end to form thereat randomly oriented light redistributing structures.

The invention further provides a multifiber fiber-optic element for use in image transfer, comprising a large number of optic fibers having ends the fibers each comprising a light transmitting core, a cladding and two facets at said ends, the fibers being cemented together at least at said ends; and microlenses formed on at least one of the two end facets of the fibers, whereby the optical invariant of the element can be changed by the microlenses.

DETAILED DESCRIPTION

Figure 1:
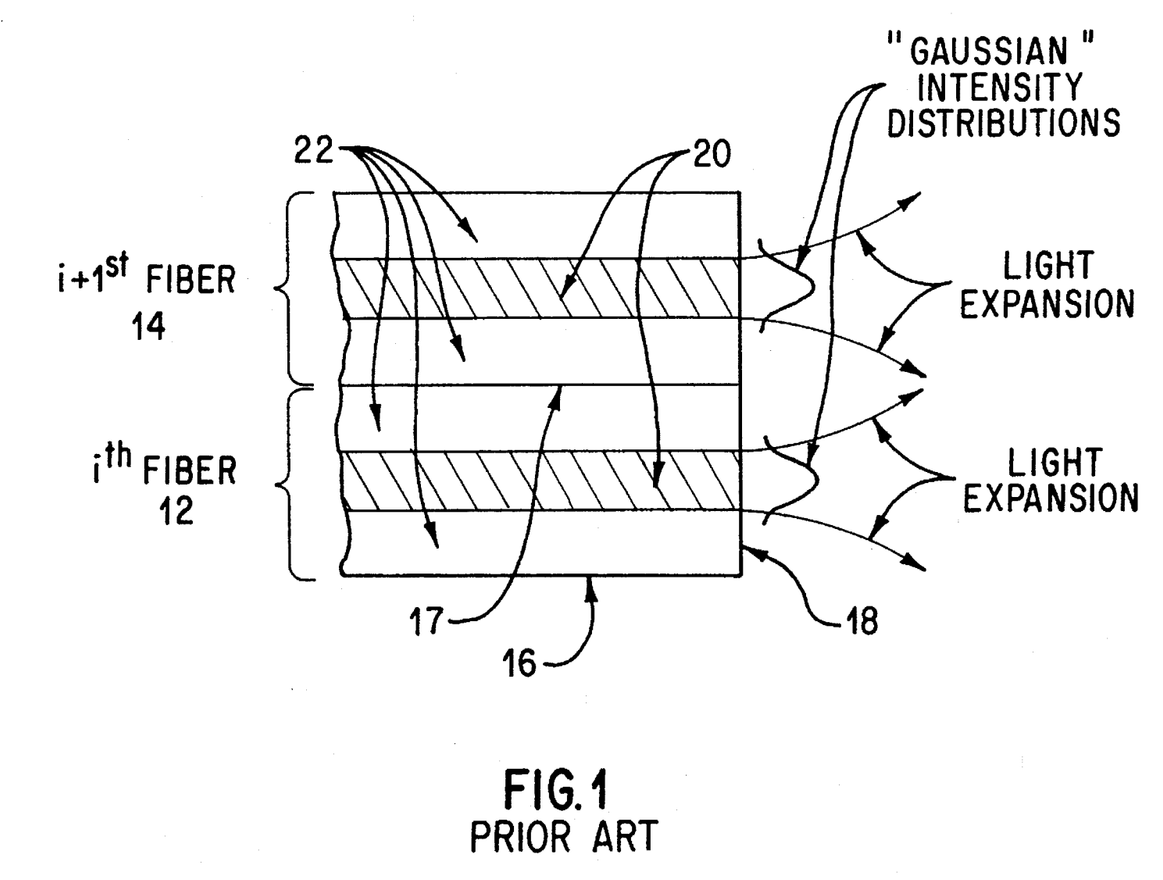
FIG. 1 schematically shows ith and i+1st fibers of a multifiber fiber-optic element and light distribution at the exit face of the fibers when the element is illuminated from the opposite end.

FIG. 1 shows a breakaway view of two fibers (12) and (14) of a multifiber fiber-optic element (16) in which cement (17) bonds the fibers (12) and (14) together. Each fiber (12), (14) has a light transmitting core (20) and an outer cladding (22), the boundary between the cores (20) and the claddings (22) causing total internal reflection in order to perpetuate transmission of light through cores (20). Fibers (12) and (14) along with the other fibers (not shown) of the fiber-optic elements (16) have a first end face (18) having substantially aligned surfaces which are perpendicular to an axis of cores (20). As shown in FIG. 1, light which is transmitted by fibers (12) and (14) (in the case of a single mode fiber) will exit from cores (20) at the first face (18) at a given exit angle (defining the aperture of the fiber) with a given intensity distribution which is substantially Gaussian; i.e., there is a strong peak of intensity at the very center of cores (20) and the intensity diminishes to zero at the circumference of the cores (20) as shown. In the first preferred embodiment, the multifiber fiber-optic element (16), which includes anywhere from a few tens of thousands to several million fibers arranged in a bundle or faceplate cemented together by cement (17) at least at the ends of the element (16), is provided with a layer of photosensitive material (30). In the first preferred embodiment, the optic fibers used in element (16) are single mode fibers and a second end (24) (FIG. 2) of the fiber-optic element (16) is exposed to diffuse light. A beam of laser light (32) passes through a moving or permanent first diffuser (34) having very small scattering centers producing a second wide aperture diffuse light source (36) on second end (24) which enters cores (20) within the acceptance angle of the apertures of cores (20) and travels along each optic fiber of elements (16) until it exits at first face (18) to expose the photosensitive layer (30). The diffuse light source (36) will create in each of the fibers of elements (16) an even distribution of light to form the Gaussian distribution of light as shown in FIG. 1. The diffuse light source may be in the form of a fluorescent light source emitting a substantially monochromatic light substantially evenly over the second ends (24). As the light leaving face (18) of element (16) exposes photosensitive layer (30), the exposure occurs in accordance with the Gaussian curve distribution which is used to create a curved formation on the first face (18) of the optic fibers of element (16). Once the photosensitive layer 30 has been exposed, it may be chemically processed, such as by ion etching or ion-assisted etching, to form a microlens centered over each core (20). The microlenses have a diameter equal to the average space between the individual fibers and their focal length is equal to the distance separating the created lenses from the fiber's end.

Figure 3:
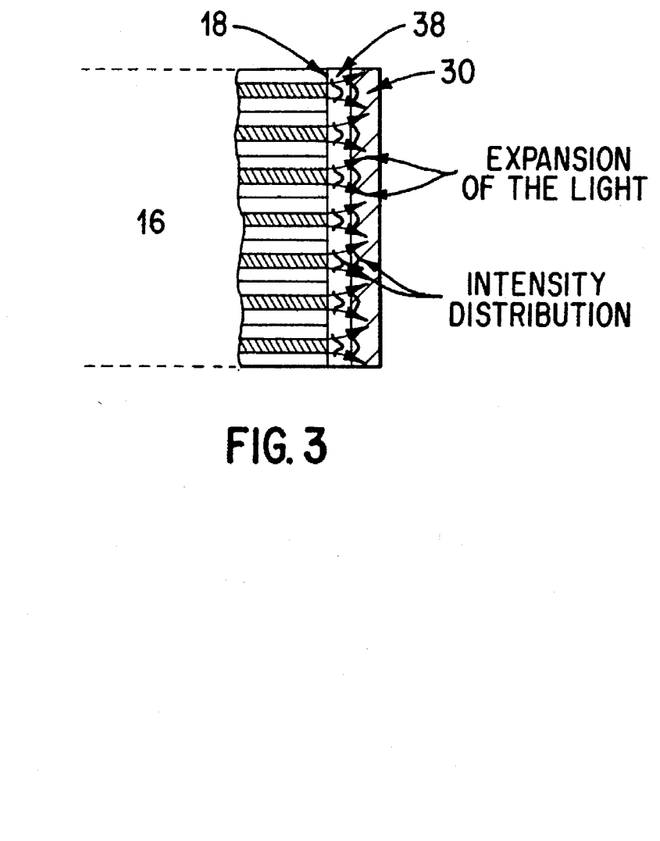
FIG. 3 schematically shows the position of an additional optically transparent layer used as substratum to create the light redistributing structure, placed between the fiber-optic element and the layer of the photosensitive material.

In the second preferred embodiment, as shown in FIG. 3, an additional transparent layer (38) is first applied to first face (18) of element (16) before applying photosensitive layer (30), such that a small distance separating face (18) and photosensitive layer (30) is established. This layer may be of $SiO_2$ which is chemically resistant and transparent over a wide spectral range.

Figure 4:
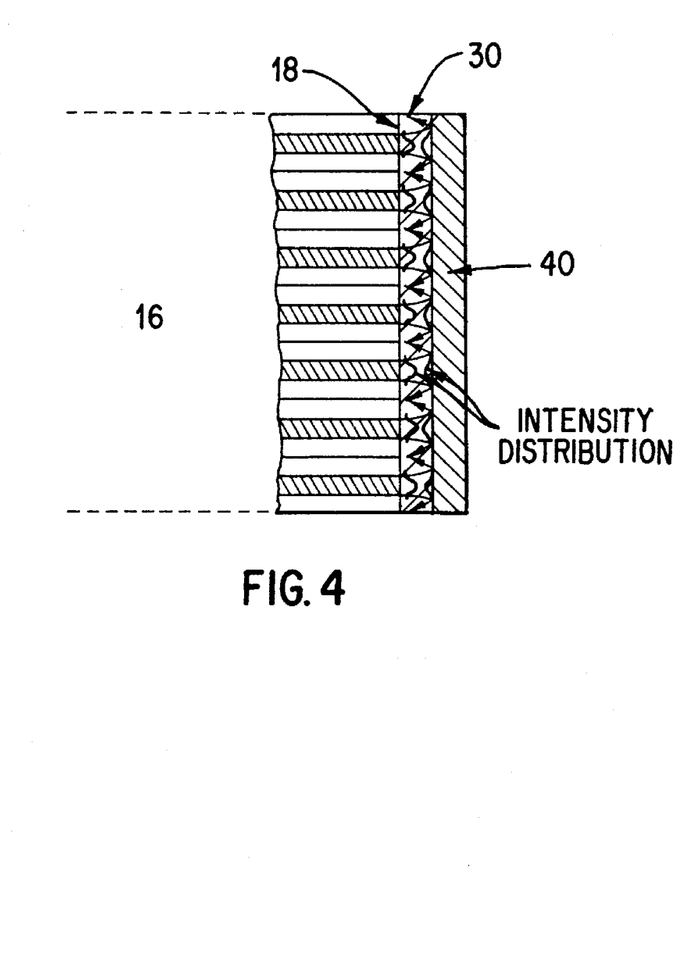
FIG. 4 demonstrates an application of an auxiliary mirror to improve exposure uniformity across the photosensitive layer.

As shown in FIG. 4, it is also possible to make use of a mirror (40) to enhance the exposure process. In the first preferred embodiment, the photosensitive layer (30) is substantially transparent. Therefore, the light exposing photosensitive layer (30) may only partly be absorbed by the layer (30), and therefore by placing mirror (40) over layer (30), and any light escaping layer 30 may be reflected back through and into layer (30) to cause further exposure. It will be clear to one skilled in the art that the quantity of light used to expose layer (30) is a parameter which must be carefully controlled in order to ensure a proper uniform exposure.

Figure 2:
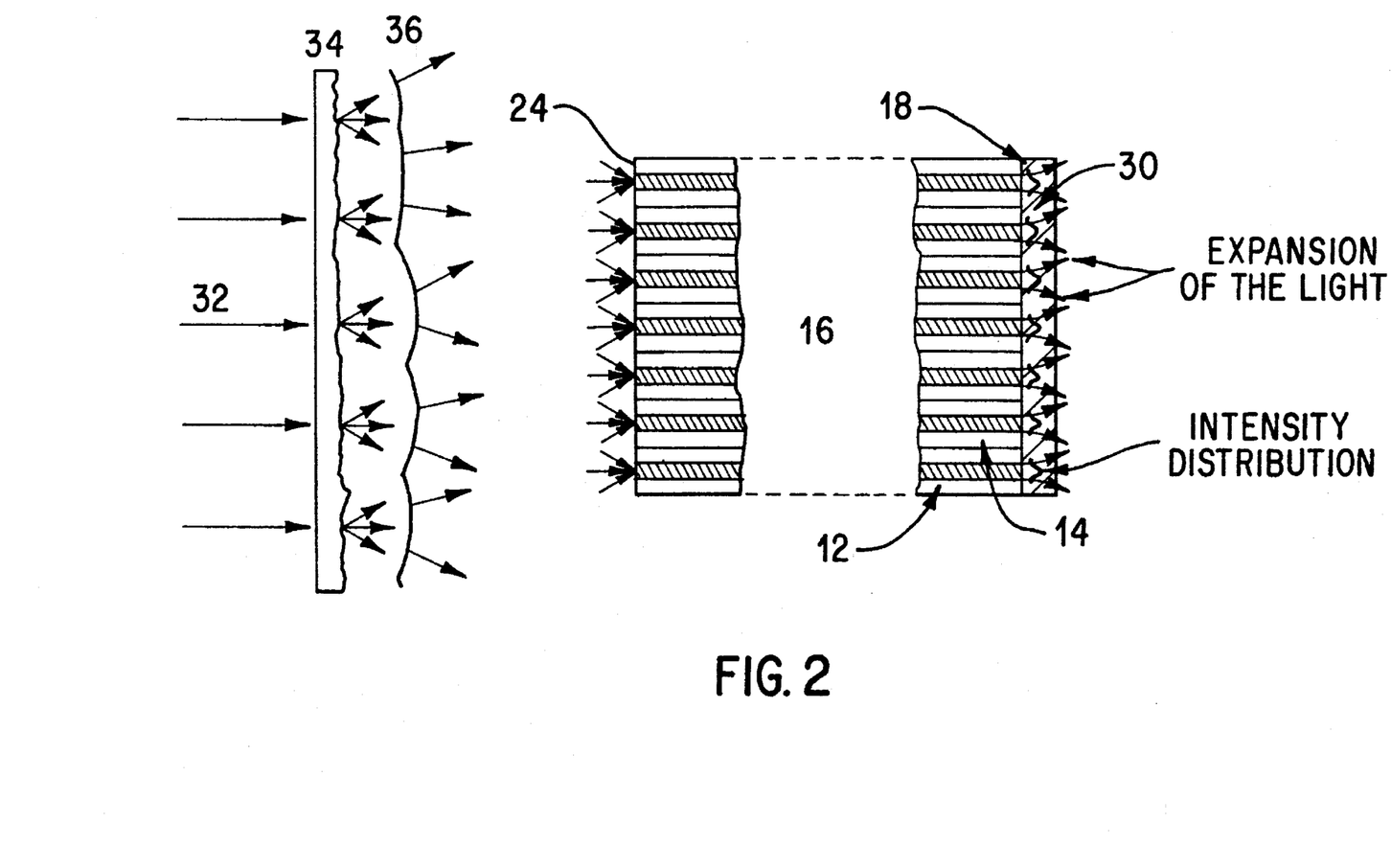
FIG. 2 represents the schematic diagram of the optical setup used to create light transforming structures correlated with the distribution of the fibers in a multifiber fiber-optic element, on the surface of the element.
Figure 5:
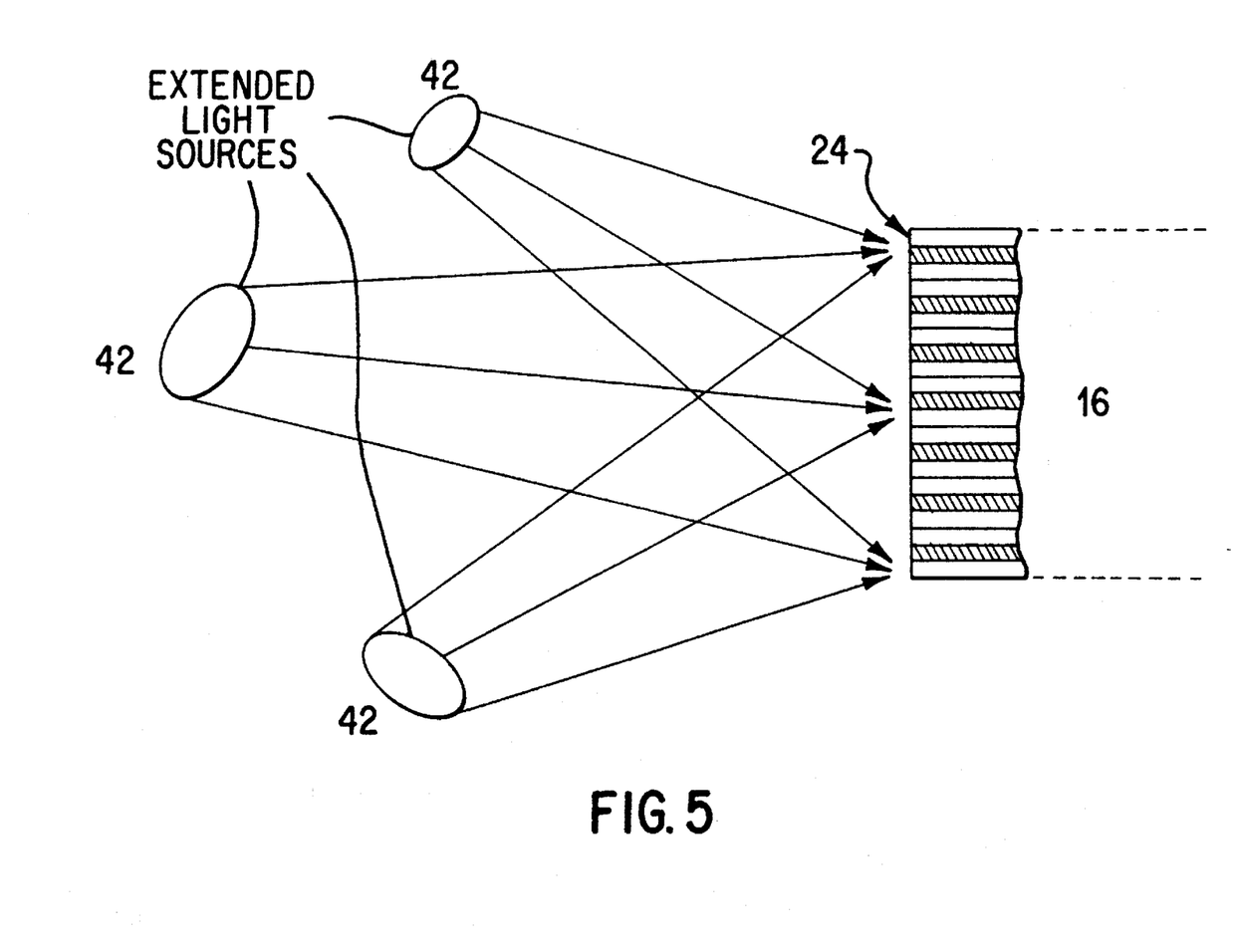
FIG. 5 schematically demonstrates an alternative method of creation of the optical field applied for creation of the light transforming structure on the fiber-optic element by using many coherent optical sources.

Instead of using a diffuser screen (34) as shown in FIG. 2, it is also possible to use a plurality of extended coherent light sources (42) to illuminate entry face (24) of fiber-optic elements (16) as shown in FIG. 5. In this case, the plurality of extended light sources (42) will create a complex interference structure, as in holographic illumination.

Figure 6:
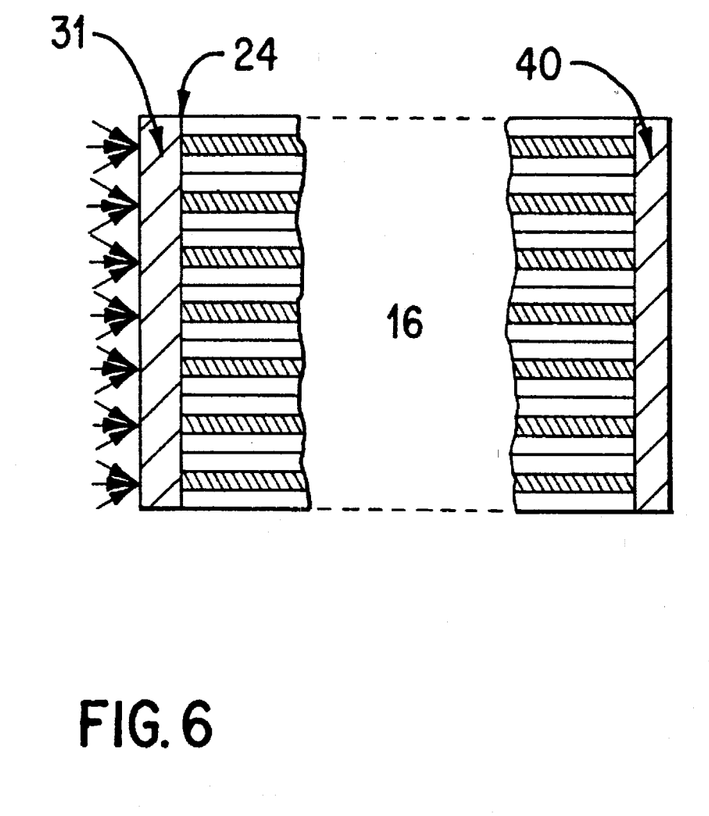
FIG. 6 schematically shows a method of producing on the surface of the multifiber fiber-optic element the light redistributing structure not correlated with distribution of the fibers.

In the third preferred embodiment as shown in FIG. 6, the multifiber fiber-optic element (16) is provided merely with a photosensitive layer (31) on face (24) of element (16) by a diffuse light source (36) comprising beam (32) and diffuser (34). The diffuse light source will purposefully include a large number of random bright spots to create a random micropattern of light redistributing structures on the photosensitive layer (31). To further augment the effect, an auxiliary mirror (40) may be added to face (18) of the fiber-optic element in order to reflect back small qualities of light which have entered through the cores (20) at face (24).

Figure 7:
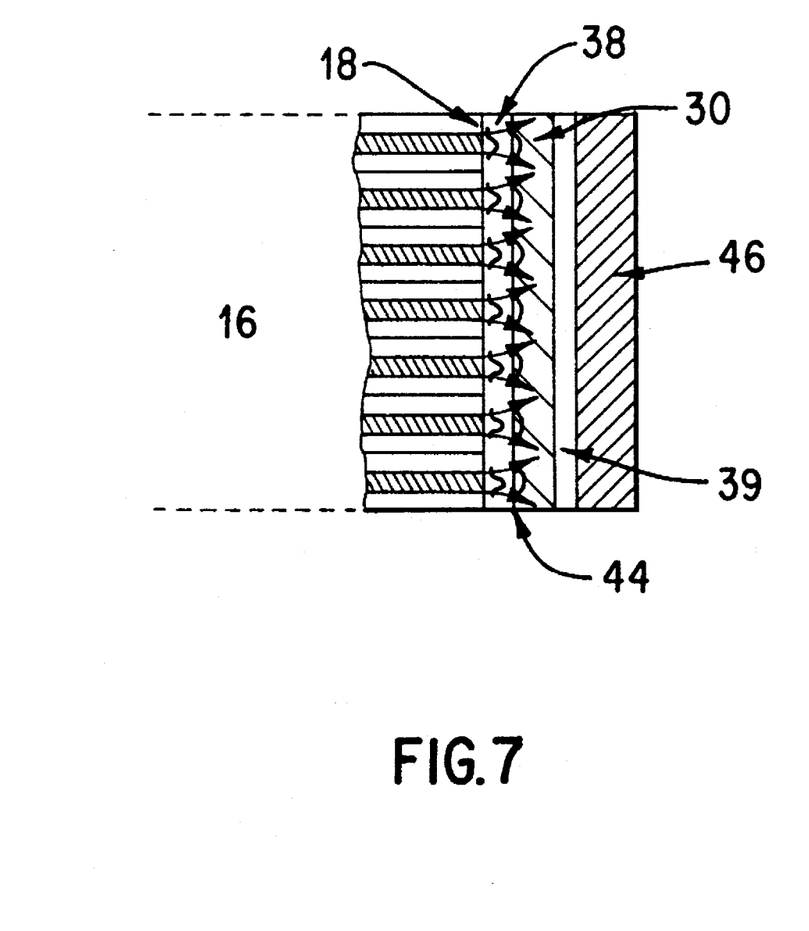
FIG. 7 shows relative position of a fiber-optic element and an independent substratum with a light sensitive layer how they are arranged during the exposure to create the light redistributing structure correlated with the distribution of the fibers in given fiber-optic element in form of the separate plate.

As shown in FIG. 7, in the fourth preferred embodiment the photosensitive layer (30) is attached to an independent substratum (46) via an additional layer (39) for the purposes of creating a faceplate to be used in conjunction with face (18) of elements (16). The pattern of microlenses formed on photosensitive layer (30) would of course correspond precisely with the disposition of the array of cores (20) in the bundle of optical fibers of element (16). Once created, the microlenses provided on photosensitive layer 30 can be put into place or removed as part of a faceplate comprising substratum (46) layer (39) and layer (30). This can be useful for making a series of faceplates provided with microlenses having different optical properties which can be easily exchanged depending on the optical requirements.

Finally, applicant wishes to emphasize that the terms "microlens" and "light redistributing structure" are used interchangeably. It should be understood, however, that "lens" as used herein does not necessarily mean an axially symmetric optical element, but instead refers to the structure formed according to the process of the present invention. More particularly, an axially symmetric optical lens element can be created photolithographically only when photosensitive material is exposed with a light beam having symmetric intensity distribution. Regardless of the distribution of incident light, the axially symmetric intensity distribution at the exit end of the fiber is only observed for so-called monomode fibers; i.e., fibers having a core diameter comparable to the wavelength of applied light. In the case of multimode fibers which have a larger core diameter intensity distribution at the exit end of the fiber depends on coherence of applied light. Thus, when laser light is used it has a distinctive speckle-like structure; i.e., structure with random variations of the intensity. Exposure of the photoresist or other photosensitive material with such speckled light, after processing will result in an array of scattering centers of random size and depth correlated to intensity variations in the speckled light beam on the exit side of the fiber. This type of structure is also encompassed by the terms "light distributing structure" and microlenses as used herein.

I claim:

1. A method of changing an optical invariant of a multifiber fiber-optic element comprising the steps of:

providing a multifiber fiber-optic element which includes a plurality of individual optic fibers having first and second ends;

providing a transparent sheet having one side against the first ends;

providing a layer of photosensitive material to cover another side of said sheet;

exposing the second ends of the fibers to substantially evenly diffuse light to which the photosensitive material is sensitive, part of said light entering at said second ends and travelling along said fibers to expose said photosensitive material at the first end on said sheet; and processing said layer at said first ends to form thereat a light redistributing structure in front of each first end of the fibers on the sheet.

2. Method according to claim 1, wherein said diffuse light is achieved using a beam of direct, substantially monochromatic light, to which the photosensitive material reacts, diffused by a moving or permanent diffuser to produce substantially evenly diffuse light over the second ends of the fibers.

3. Method according to claim 1, wherein said diffuse light is achieved using a plurality of point or spatially extended coherent sources of light.

4. Method according to claim 1, wherein said diffuse light is achieved using a fluorescent light source emitting a substantially monochromatic light substantially evenly over the second ends.

5. Method according to claim 1, wherein the step of providing a transparent sheet having one side against the first ends is performed prior to the step of providing a layer of photosensitive material to cover another side of said sheet.

6. Method according to claim 1, further including the step of providing a mirror at said first ends, whereby a part of said light which may pass through said layer may be reflected back through said layer to increase exposure.

7. Method according to claim 1, wherein said processing step includes chemical etching of said layer to etch at least one microlens in said layer adjacent the first ends of said fibers.

8. Method according to claim 1, wherein said processing step includes ion-assisted etching of said layer to etch at least one microlens in said layer adjacent the first ends of said fibers.

9. Method according to claim 6, wherein said processing step includes ion-assisted etching of said layer to etch at least one microlens in said layer adjacent the first ends of said fibers.

10. A method of changing an optical invariant of a multifiber fiber-optic element comprising the steps of:

providing a multifiber fiber-optic element which includes a plurality of individual optical fibers having first and second ends;

providing a transparent sheet having one side against the first ends;

providing a layer of photosensitive material to cover another side of said sheet;

exposing said layer to unevenly diffuse light to which the photosensitive material is sensitive, to expose said photosensitive material at the first end; and processing said photosensitive material at said first ends on said sheet to form thereat light redistributing structures at the first ends of said fibers.

11. Method according to claim 10, wherein the step of providing a transparent sheet having one side against the first ends is performed prior to the step of providing a layer of photosensitive material to cover another side of said sheet.

12. Method according to claim 10, further comprising the step of providing a mirror at said second end, whereby a part of said light exposing said photosensitive material may be reflected back through said fibers to said photosensitive material to increase exposure.

13. Method according to claim 10, wherein said processing step includes chemical etching of said layer to etch said light redistributing structures in said layer adjacent the first ends of said fibers and wherein said light redistributing structures are randomly oriented.

14. Method according to claim 10, wherein said processing step includes ion etching of said layer to etch at least one microlens in said layer adjacent the first ends of said fibers.

15. Method according to claim 10, wherein said processing step includes ion-assisted etching of said layer to etch at least one microlens in said layer adjacent the first ends of said fibers.

\* \* \* \* \*